United States Patent
Lee (10) Patent No.: US 8,691,405 B2
(45) Date of Patent: Apr. 8, 2014

(54) SECONDARY BATTERY WITH CONNECTION PORTION INTERCONNECTING PROTECTION MODULE AND BARE CELL

(75) Inventor: Sangjoon Lee, Suwon-si (KR)

(73) Assignee: Samsung SDI Co., Ltd. (KR)

(*) Notice: Subject to any disclaimer, the term of this patent is extended or adjusted under 35 U.S.C. 154(b) by 539 days.

(21) Appl. No.: 12/771,001

(22) Filed: Apr. 30, 2010

(65) Prior Publication Data
US 2010/0323225 A1     Dec. 23, 2010

(30) Foreign Application Priority Data
Jun. 18, 2009   (KR) .................. 10-2009-0054297

(51) Int. Cl.
  *H01M 14/00*   (2006.01)
  *H01M 2/34*    (2006.01)
(52) U.S. Cl.
  USPC .............. 429/7; 429/56; 429/61; 429/122; 429/170
(58) Field of Classification Search
  USPC ........ 429/7, 61, 122, 56, 170; 29/592, 592.1, 29/623.1; 361/683
  See application file for complete search history.

(56) References Cited

U.S. PATENT DOCUMENTS

| | | | |
|---|---|---|---|
| 2005/0175889 A1 | 8/2005 | Han | |
| 2006/0099492 A1 | 5/2006 | Jeon | |
| 2006/0246350 A1 | 11/2006 | Takayama et al. | |
| 2007/0160878 A1 | 7/2007 | Kim et al. | |
| 2008/0118825 A1 | 5/2008 | Yoon | |
| 2008/0233472 A1* | 9/2008 | Ota et al. | 429/122 |
| 2009/0130554 A1 | 5/2009 | Jang et al. | |
| 2009/0155632 A1* | 6/2009 | Byun et al. | 429/7 |
| 2009/0186268 A1 | 7/2009 | Song | |

FOREIGN PATENT DOCUMENTS

| | | |
|---|---|---|
| CN | 101442138 A | 5/2009 |
| CN | 101488563 A | 7/2009 |
| EP | 2 071 648 A1 | 6/2009 |
| JP | 2000-243362 A | 9/2000 |
| JP | 2004-335387 A | 11/2004 |

(Continued)

OTHER PUBLICATIONS

D.B. Roberts Company, Fastener Reference Guide, Mar. 5, 2005. Retrieved Sep. 5, 2012 from Wayback Machine, Web Site: http://www.dbroberts.com/dbroberts_fastener_guide.pdf.*

(Continued)

*Primary Examiner* — John Maples
*Assistant Examiner* — Jimmy K Vo
(74) *Attorney, Agent, or Firm* — Knobbe Martens Olson & Bear LLP (57) ABSTRACT

A secondary battery, including a bare cell provided with coupling portion, a protection circuit module provided with a circuit board, and connecting member electrically connecting the bare cell to the protection circuit module. The coupling portion has a contact recess. The protection circuit module is adapted to control the charging/discharging of the bare cell. the connecting member has a bare cell connecting portion. The bare cell connecting portion has an insertion portion inserted into the contact recess.

22 Claims, 9 Drawing Sheets

(56) References Cited

FOREIGN PATENT DOCUMENTS

| | | |
|---|---|---|
| JP | 2005-285680 A | 10/2005 |
| JP | 2006-140149 A | 6/2006 |
| JP | 2006-147193 A | 6/2006 |
| JP | 2006-156326 A | 6/2006 |
| JP | 2006-164531 A | 6/2006 |
| JP | 2006-236879 A | 9/2006 |
| JP | 2006-302662 A | 11/2006 |
| JP | 2006-313733 A | 11/2006 |
| JP | 2008-027624 A | 2/2008 |
| JP | 2009-521094 A | 5/2009 |
| KR | 10-2004-0054232 A | 6/2004 |
| KR | 2008-0013212 A | 2/2008 |
| KR | 2008-0045371 A | 5/2008 |
| KR | 10-2009-0051590 A | 5/2009 |
| KR | 10-2009-0062539 A | 6/2009 |
| WO | 2007/073066 A1 | 6/2007 |

OTHER PUBLICATIONS

European Search Report dated Sep. 14, 2010 issued by the KIPO for corresponding Korean Patent Application No. 10-2009-0054297.
European Search Report dated Feb. 25, 2011 issued by the EPO for corresponding Korean Patent Application No. 10-2009-0054297—10 pages.
Korean Examination Report dated Sep. 27, 2010 issued by the KIPO for corresponding Korean Patent Application No. KR 10-2009-0054297.
Chinese Office Action dated Sep. 7, 2012 of corresponding Chinese Patent Application No. 201010207334.8—6 pages.
Notice of Allowance dated May 14, 2013 of corresponding Japanese Patent Application No. 2009-258085—2 pages.

* cited by examiner

SECONDARY BATTERY WITH CONNECTION PORTION INTERCONNECTING PROTECTION MODULE AND BARE CELL

CROSS-REFERENCE TO RELATED APPLICATION

This application claims the benefit of Korean Application No. 10-2009-0054297, filed in the Korean Intellectual Property Office on Jun. 18, 2009, the disclosure of which is incorporated herein by reference.

BACKGROUND OF THE INVENTION

1. Field of the Invention

Aspects of the present invention relate to secondary batteries.

2. Description of the Related Art

Recent rapid advances in the electronics, communications and computer industries have increased the use of portable electronic devices. Most of such portable electronic devices employ rechargeable secondary batteries as power sources.

Secondary batteries are widely used at present in the form of battery packs. A typical secondary battery pack has a structure in which a bare cell serving as an electrical energy source and a protection circuit module (PCM) adapted to stably control the charging/discharging of the bare cell are combined into one unit. Coupling structures between protection circuit modules and bare cells of secondary battery packs are required to have good workability and electrical connection.

SUMMARY OF THE INVENTION

According to an aspect of the present invention, a secondary battery is provided. The secondary battery includes a bare cell provided with at least one coupling portion, each having a contact recess; a protection circuit module provided with a circuit board and adapted to control the charging/discharging of the bare cell; and a connecting member electrically connecting the bare cell to the protection circuit module, the connecting member having a bare cell connecting portion, wherein the bare cell connecting portion has an insertion portion inserted into the contact recess.

According to another aspect of the present invention, the contact recess may include a bottom surface and side wall surface extending from the bottom surface; and the insertion portion of the connecting member may include a bottom plate in close contact with the bottom surface of the contact recess and side wall portion in close contact with the side wall surface of the contact recess.

According to another aspect of the present invention, the bare cell connecting portion may further include a base at which the insertion portion is formed; and the insertion portion may be in the form of a recess.

According to another aspect of the present invention, the connecting member may further including a circuit board connecting portion connected to the circuit board of the protection circuit module and a connecting portion connecting the bare cell connecting portion to the circuit board connecting portion.

According to another aspect of the present invention, each coupling portion of the bare cell may have a corresponding screw groove; and the secondary battery may further include coupling screws, each coupled to a corresponding screw groove to fasten the bare cell connecting portion of the connecting member to the bare cell.

According to another aspect of the present invention, the secondary battery may further include an electrode assembly, a can accommodating the electrode assembly therein and having an opening, and a cap plate closing the opening of the can; wherein the at least one coupling portions may be formed in the cap plate. The cap plate may be in the form of a bar that extends in one direction, and one coupling portion may be disposed at each end of the cap plate in the lengthwise direction. The coupling portion may be thicker than any other portion of the cap plate.

According to another aspect of the present invention, the secondary battery may further include a top case covering the protection circuit module and having a pressing protrusion which pressurizes the bare cell connecting portion of the connecting member.

According to another aspect of the present invention, a secondary battery is provided. The secondary battery includes: a bare cell provided with at least one coupling portion, each including a contact recess; a protection circuit module provided with a circuit board and adapted to control the charging/discharging of the bare cell; and a connecting member to electrically connect the bare cell to the protection circuit module, the connecting member including an insertion portion seated on the contact recess of the bare cell, wherein the diameter of the contact recess decreases inwardly.

According to another aspect of the present invention, the insertion portion may be in the form of a protrusion whose shape corresponds to the shape of the contact recess and whose diameter decreases toward the distal end thereof.

According to another aspect of the present invention, the secondary battery may further include a pressing portion to pressurize the insertion portion of the connecting member toward the contact recess.

According to another aspect of the present invention, the secondary battery may further include a coupling screw which fastens the connecting member to the bare cell, and the pressing portion may be a head formed in the coupling screw.

According to another aspect of the present invention, the insertion portion of the connecting member may have a recess accommodating the head of the coupling screw therein.

According to another aspect of the present invention, the head of the coupling screw may be in the form of a truncated cone whose diameter decreases toward a body of the coupling screw.

According to another aspect of the present invention, the insertion portion of the connecting member may have a through-hole through which the coupling screw passes.

According to another aspect of the present invention, the secondary battery may further include a top case covering the protection circuit module and including a pressing protrusion as the pressing portion. The insertion portion of the connecting member may have a recess into which the pressing protrusion is inserted. The diameter of the pressing protrusion may decrease toward the distal end of the pressing protrusion. The insertion portion of the connecting member may be in the form of a truncated cone whose shape corresponds to the shape of the pressing protrusion and whose diameter decreases toward the distal end thereof. The secondary battery may further include a coupling screw fastening the top case to the bare cell. The secondary battery may further include: an electrode assembly; a can accommodating the electrode assembly therein and having an opening; and a cap plate closing the opening of the can, and the coupling portion may be formed in the cap plate.

Additional aspects and/or advantages of the invention will be set forth in part in the description which follows and, in part, will be obvious from the description, or may be learned by practice of the invention.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
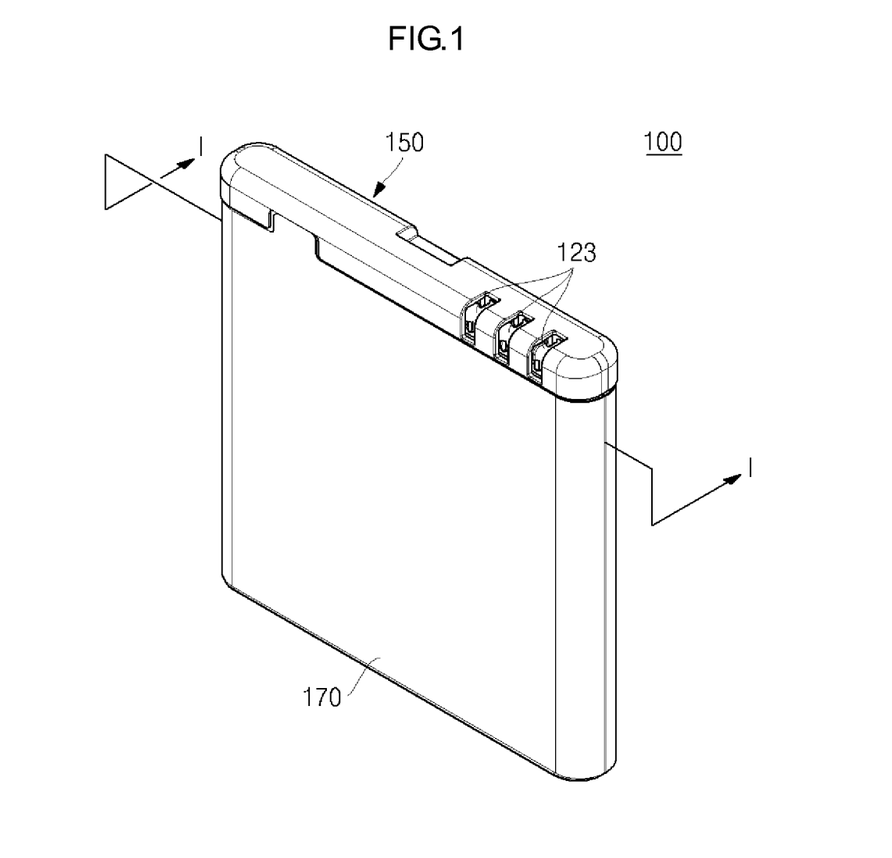
FIG. 1 is a perspective view of a secondary battery according to a first embodiment of the present invention.
Figure 2:
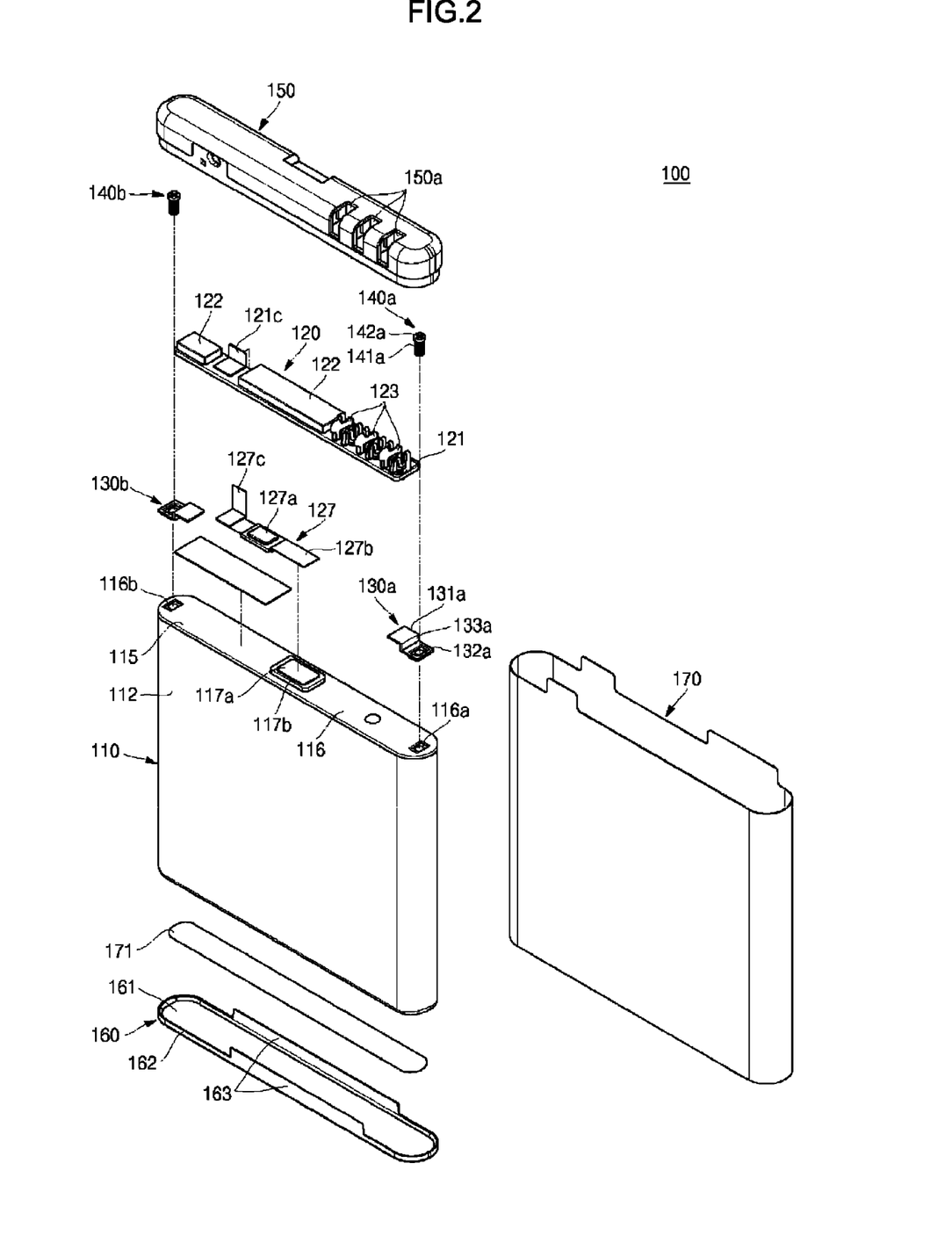
FIG. 2 is an exploded perspective view illustrating the secondary battery of FIG. 1.
Figure 3:
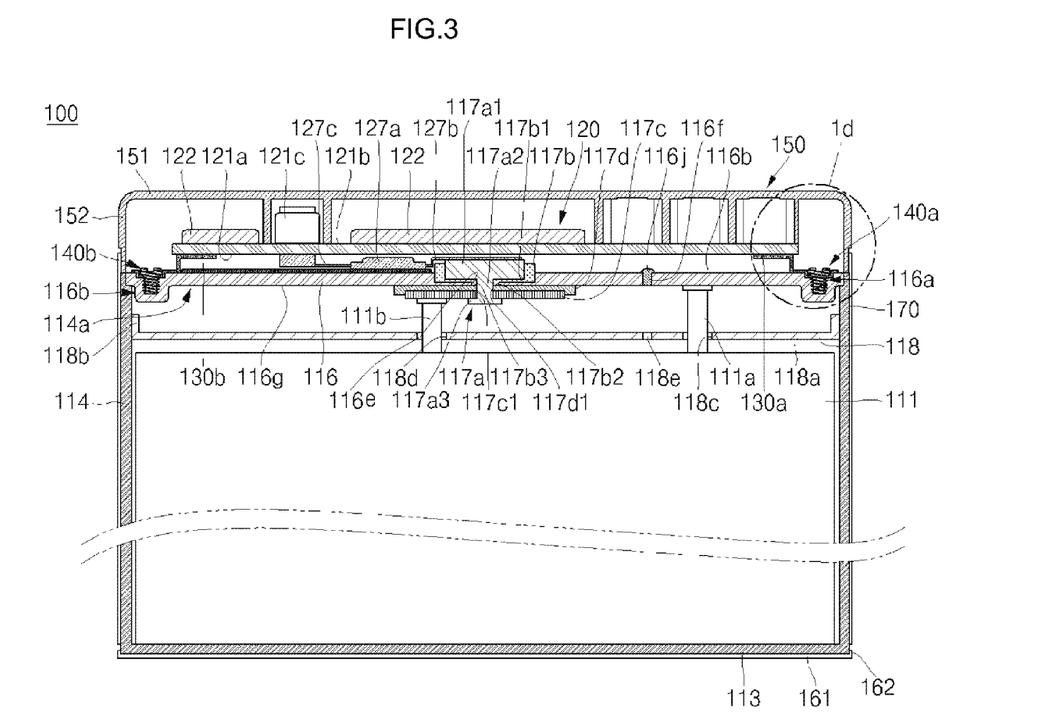
FIG. 3 is a partial cross-sectional view taken along line I-I of FIG. 1.
Figure 4:
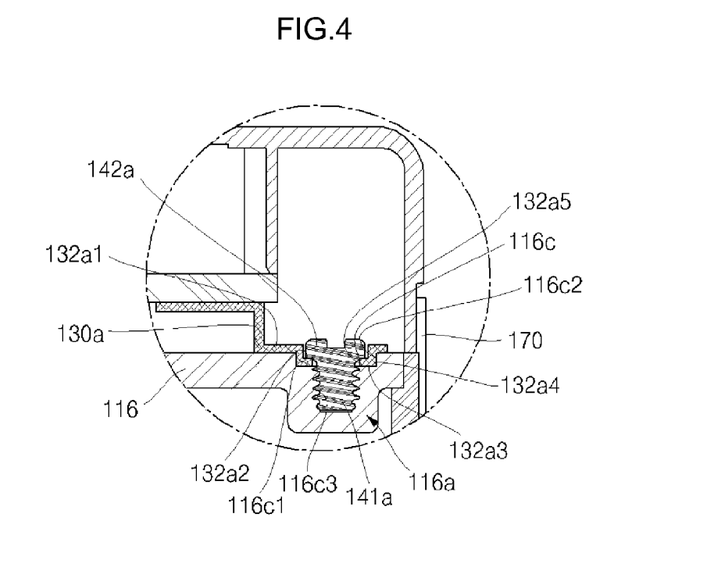
FIG. 4 is an enlarged cross-sectional view illustrating the first coupling screw and its adjacent elements in the secondary battery of FIG. 3.

A secondary battery according to a first embodiment of the present invention will be described in detail with reference to FIGS. 1 through 4. FIG. 1 is a perspective view of the secondary battery. FIG. 2 is an exploded perspective view illustrating the secondary battery of FIG. 1. FIG. 3 is a partial cross-sectional view taken along line I-I of FIG. 1, and FIG. 4 is an enlarged cross-sectional view illustrating the first coupling screw and its adjacent elements in the secondary battery of FIG. 3.

Referring to FIGS. 1 through 4, the secondary battery 100 includes a bare cell 110, a protection circuit module (PCM) 120, a positive temperature coefficient (PTC) thermistor 127, first and second connecting members 130a and 130b, first and second coupling screws 140a and 140b, a top case 150, a bottom case 160, and a label 170. In the secondary battery 100, the use of the protection circuit module 120 stabilizes the charging/discharging of the bare cell 110.

The bare cell 110 includes an electrode assembly 111, a can 112, a cap assembly 115, and an insulating case 118. The bare cell 110 stores electrical energy supplied from a charger (not shown) and supplies the electrical energy to an external load (not shown).

The electrode assembly 111 includes a first electrode plate (not shown), a second electrode plate (not shown) and a separator interposed between the two electrode plates. The electrode assembly 111 is wound in a jelly-roll type. A first conductive electrode tab 111a is coupled to the first electrode plate. The first electrode tab 111a is electrically connected to the cap assembly 115. A second conductive electrode tab 111b is coupled to the second electrode plate. The second electrode tab 111b is electrically connected to the cap assembly 115. In this embodiment, the first and second electrode plates are defined as positive and negative electrode plates, respectively. Thus, the first and second electrode tabs 111a and 111b are positive and negative electrode tabs, respectively. In an alternative embodiment, the first electrode plate may function as a negative electrode plate and the second electrode plate may function as a positive electrode plate. In this case, the first electrode tab 111a is a negative electrode tab and the second electrode tab 111b is a positive electrode tab.

The can 112 includes a bottom plate 113 in the form of an elongated bar that extends in one direction, and sidewalls 114 extending from the edges of the bottom plate 113. The can 112 provides a space in which the electrode assembly 111 and the insulating case 118 are accommodated. The inner area of the can 112 defined by the distal ends of the sidewalls 114 is opened to form an opening 114a as an entrance into which the electrode assembly 111 and the insulating case 118 are inserted. The shape and the size of the opening 114 are substantially the same as those of the bottom plate 113. The opening 114a is closed by the cap assembly 115. The can 112 may be constructed by molding a lightweight and flexible plate member made of a metal material such as aluminum or an aluminum alloy. The molding may be performed by deep drawing.

The cap assembly 115 includes a cap plate 116, an electrode terminal 117a, an insulating gasket 117b, a terminal plate 117c, and an insulating plate 117d. The cap assembly 115 closes the opening 114a of the can 112 and provides two terminal parts of the bare cell 110.

The cap plate 116 has first and second coupling portions 116a and 116b, a terminal through-hole 116e, and an electrolyte injection hole 116f. The cap plate 116 is a metal plate that has a size and a shape corresponding to those of the opening 114a of the can 112. The cap plate 116 has an elongated shape that extends in one direction, like the bottom plate 113. The cap plate 116 is placed on the upper ends of the sidewalls 114 of the can 112, and attached by an appropriate technique (e.g., laser welding or other joining technique). As a result, the cap plate 116 is joined to the sidewalls 114 of the can 112 to close the opening 114a. The cap plate 116 has a first surface 116g directing toward the inner space of the can 112, and a second surface 116h opposite to the first surface 116g and exposed to the outside of the can 112. The first electrode tab 111a of the electrode assembly 111 is connected to the first surface 116g by an appropriate technique to allow the cap plate 116 to serve as a first terminal part of the bare cell 110.

The first coupling portion 116a and the second coupling portion 116b are disposed at both distal ends in the lengthwise direction of the cap plate 116. The first connecting member 130a and the second connecting member 130b are coupled to the first coupling portion 116a and the second coupling portion 116b, respectively.

The first coupling portion 116a has a first contact recess 116c formed at the second surface 116h of the cap plate 116 and a first screw groove 116c3 formed within the first contact recess 116c. The contact recess 116c has a bottom surface 116c1 and side wall surfaces 116c2 extending upward from the bottom surface 116c1. The bottom surface 116c1 and the side wall surfaces 116c2 are formed at substantially right angles to each other. The drawings show that the first contact recess 116c is in the shape of a quadrangle, but the shape of the first contact recess 116c is not limited to the quadrangle. For example, the first contact recess 116c may have a circular, polygonal, or triangular shape. The first contact recess 116c provides a space into which a portion of the first connecting member 130a can be press-fitted.

The first screw groove 116c3 extends at right angles to the bottom surface 116c1 of the first contact recess 116c. The first screw groove 116c3 serves as a space to which the first coupling screw 140a is coupled. The first surface 116g of the cap plate 112 protrudes downward to make the first coupling portion 116a thicker than other portions around the first coupling portion 116a. With this configuration, the first contact recess 116c and the first screw groove 116c3 have sufficient depths.

The second coupling portion 116b is structurally and functionally identical to the first coupling portion 116a, and a detailed explanation thereof is thus omitted. The second connecting member 130b is fastened to the second coupling portion 116b via the second coupling screw 140b.

The terminal through-hole 116e is formed in the central portion of the cap plate 116. The terminal through-hole 116e serves as a passage through which the electrode terminal 117c can pass. The electrolyte injection hole 116f is formed at a position between the terminal through-hole 116e and the first coupling portion 116a. The electrolyte injection hole 116f serves as a passage through which an electrolyte is injected into the can 112. After completion of the electrolyte injection, the electrolyte injection hole 116f is closed by a stopper 116j.

The electrode terminal 117a has a body 117a1 and a connecting portion 117a2 extending downward from the body 117a1. The electrode terminal 117a is electrically connected to the second electrode tab 111b of the electrode assembly 111 and is electrically insulated from the cap plate 116 by the insulating gasket 117b. Due to this electrical connection and insulation, the electrode terminal 117a may function as a second terminal part of the bare cell 110.

The body 117a1 is positioned on the second surface 116h of the cap plate 116. The body 117a1 is exposed to the outside of the bare cell 110 and is electrically connected to the protection circuit module 120. The connecting portion 117a2 extending downward from the body 117a1 passes through the terminal through-hole 116e of the cap plate 116 such that the distal end 117a3 thereof is positioned in the inner space of the can 112. The distal end 117a3 of the connecting portion 117a2 is spread by a suitable method, such as caulking, so that the cap plate 116, the electrode terminal 117a, the insulating gasket 117b, the terminal plate 117c and the insulating plate 117d are coupled to one another.

The insulating gasket 117b has a mounting portion 117b1 on which the body 117a1 of the electrode terminal 117a is seated, and an insertion portion 117b2 protruding from the mounting portion 117b1 and inserted into the terminal through-hole 116e of the cap plate 116. The insulating gasket 117b is made of an insulating material to electrically insulate the electrode terminal 117a and the cap plate 116 from each other. The insulating gasket 117b has an insertion hole 117b3 penetrating the mounting portion 117b1 and the insertion portion 117b2. The insertion hole 117b3 serves as a passage through which the connecting portion 117a2 of the electrode terminal 117a passes.

The terminal plate 117c is made of a conductive material, such as nickel. The terminal plate 117c is positioned on the first surface 116g of the cap plate 116 and is coupled to the electrode terminal 117a. The terminal plate 117c has an area large enough for the second electrode tab 111b of the electrode assembly 111 to be coupled thereto. The second electrode tab 111b of the electrode assembly 111 is joined to the terminal plate 117c by an appropriate technique, such as laser welding. The terminal plate 117c is electrically insulated from the cap plate 116 by the insulating plate 117d. The terminal plate 117c has a first passage hole 117c1 through which the connecting portion 117a2 of the electrode terminal 117a passes.

The insulating plate 117d is made of an insulating material and is positioned between the cap plate 116 and the terminal plate 117c. The insulating plate 117d electrically insulates the cap plate 116 and the terminal plate 117c from each other. The insulating plate 117d has a second passage hole 117d1 through which the connecting portion 117a2 of the electrode terminal 117a passes.

The insulating case 118 has a body portion 118a and support portions 118b extending upward from the edges of the body portion 118a. The insulating case 118 is positioned between the electrode assembly 111 and the cap plate 116 within the can 112. The insulating case 118 electrically insulates the electrode assembly 111 from the cap plate 116 and inhibits the electrode assembly 111 from moving within the can 112.

The body portion 118a is in the form of a plate that has substantially the same shape as the opening 114a of the can 112. The body portion 118a has a first electrode tab draw-out hole 118c, a second electrode tab draw-out hole 118d, and an electrolyte introduction hole 118e. The body portion 118a faces the electrode assembly 111 and electrically insulates the electrode assembly 111 from the cap plate 116. The first electrode tab draw-out hole 118c serves as a passage through which the first electrode tab 111a of the electrode assembly 111 passes. The second electrode tab draw-out hole 118d serves as a passage through which the second electrode tab 111b of the electrode assembly 111 passes. The electrolyte introduction hole 118e serves as a passage through which an electrolyte is introduced toward the electrode assembly 111. The support portions 118b are in contact with the sidewalls 114 of the can 112 and support the body portion 118a to inhibit the electrode assembly 111 from moving within the can 112.

The protection circuit module 120 includes a circuit board 121, electrical circuit devices 122 mounted on the circuit board 121, and outer terminals 123 mounted on the circuit board 121. The protection circuit module 120 is coupled to the bare cell 110 and controls various operations of the secondary battery 100. These operations may include, for example, charge/discharge operations of the secondary battery 100.

The circuit board 121 is a printed circuit board having an interconnection pattern printed thereon. The circuit board 121 is in the shape of an elongated bar that extends in one direction. The circuit board 121 has a first surface 121a and a second surface 121b opposite to the first surface 121a. The first surface 121a of the circuit board 121 faces and is spaced a distance from the cap plate 116 of the bare cell 110. The first and second connecting members 130a and 130b are joined to both ends of the first surface 121a in the lengthwise direction of the circuit board 121 by a suitable technique, such as soldering. A conductive pad 121c is joined to the second surface 121a of the circuit board 121 by a suitable technique, such as soldering. Soldering is mentioned here as an example of a suitable joining technique; other techniques may also be employed, as would be understood by those of ordinary skill in the art. The PTC thermistor 127 is connected to the conductive pad 121c.

The electrical circuit devices 122 include two or more devices, such as a control IC and a charge/discharge switch. The electrical circuit devices 122 control the charge/discharge operations of the secondary battery 100. The electrical circuit devices 122 are joined to the second surface 121b of the circuit board 121 by a suitable technique. The outer terminals 123 are joined to the second surface 121b of the circuit board 121 by a suitable technique. The outer terminals 123 are electrically connected to an external load or a charger.

The PTC thermistor 127 includes a PTC body 127a, a first lead plate 127b and a second lead plate 127c. The PTC thermistor 127 electrically connects the protection circuit module 120 to the electrode terminal 117a, which functions as a second electrode part of the bare cell 110. The PTC thermistor 127 detects an increase in the temperature of the bare cell 110 due to an abnormal operation (e.g., overcharge), and interrupts the circuit. A temperature rise of the PTC body 127a results in a sharp increase in electrical resistance. The PTC body 127a is positioned on the cap plate 116 to allow direct detection of heat from the bare cell 110.

The first lead plate 127b extends from the PTC body 127a and is joined to the electrode terminal 117a of the bare cell 110 by an appropriate technique, such as laser welding. Again, other techniques may also be employed. The PTC body 127a is electrically connected to the electrode terminal 117a of the bare cell 110 through the first lead plate 127b.

The second lead plate 127c extends from the PTC body 127a and is joined to the conductive pad 121c of the protection circuit module 120 by an appropriate technique. The PTC body 127a is electrically connected to the protection circuit module 120 through the second lead plate 127c.

The first connecting member 130a has a circuit board connecting portion 131a, a bare cell connecting portion 132a, and a connecting portion 133a. The first connecting member 130a is made of a conductive material, such as nickel, and electrically connects the protection circuit module 120 to the cap plate 116, which functions as a first electrode part of the bare cell 110. The circuit board connecting portion 131a, the bare cell connecting portion 132a, and the connecting portion 133a may be formed by bending a one-piece plate member. The first connecting member 130a is positioned at one distal end of the first surface 121a in the lengthwise direction of the circuit board 121. The circuit board connecting portion 131a is in the form of a flat plate and is coupled to the first surface 121a of the circuit board 121 by an appropriate technique.

The bare cell connecting portion 132a has a base 132a1 and an insertion portion 132a2. The bare cell connecting portion 132a is fastened to the first coupling portion 116a of the cap plate 116 via the first coupling screw 140a. The bare cell connecting portion 132a is disposed in a region outside the circuit board 121 to ensure the screw coupling. The base 132a1 is in the form of a flat plate. The base 132a1 is in contact with the second surface 116b of the cap plate 116 and supports the insertion portion 132a2.

The insertion portion 132a2 protrudes downward from the base 132a1. The insertion portion 132a2 has a bottom plate 132a3 and side wall portions extending from the edges of the bottom plate 132a3 to the base 132a1. The insertion portion 132a2 is press-fitted into the first contact recess 116c of the cap plate 116. For ease of the press fitting, the insertion portion 132a2 has a size and a shape corresponding to those of the first contact recess 116c. The insertion portion 132a2 may be formed by pressing. The bottom plate 132a3 has a through-hole 132a5 through which the first coupling screw 140a passes. The bottom plate 132a3 is in contact with the bottom surface 116c1 of the first contact recess 116c, and the side wall portions 132a4 are in contact with the side wall surfaces 116c2 of the first contact recess 116c.

The insertion portion 132a2 is inserted into and positioned in the first contact recess 116, so that the bare cell connecting portion 132a can be aligned in a correct position for screw coupling. Further, the insertion portion 132a2 is in contact with the first contact recess 116c over a large area and the insertion portion 132a2 is in close contact with the first contact recess 116c by press fitting, leading to a reduction in electrical resistance. The connecting portion 133a connects the circuit board connecting portion 131a and the bare cell connecting portion 132, which are spaced apart from each other.

The second connecting member 130b is structurally and functionally identical to the first connecting member 130a, and a detailed explanation thereof is thus omitted. The second connecting member 130b is positioned opposite to the first connecting member 130a at the other distal end in the lengthwise direction of the circuit board 121. The second connecting member 130b has a bare cell connecting portion 132b fastened to the second coupling portion 116b of the cap plate 116 via the second coupling screw 140b.

The first coupling screw 140a has a threaded body 141a and a head 142a formed at one end of the body 141a. The first coupling screw 140a fastens the first connecting member 130a to the cap plate 116. The body 141a is fixedly inserted into the first screw groove 116c3 of the cap plate 116. The head 142a is accommodated in the insertion portion 132a2 of the bare cell connecting portion 132a of the first connecting member 130a. The head 142a is in close contact with the bottom plate 132a3 of the insertion portion 132a2 to further enhance the coupled state of the bare cell connecting portion 132a press-fitted into the first contact recess 116c.

The second coupling screw 140b is structurally and functionally identical to the first coupling screw 140a, and a detailed explanation thereof is thus omitted. The second coupling screw 140b fastens the second connecting member 130b to the cap plate 116.

The top case 150 includes a cover plate 151 and sidewalls 152 extending from the cover plate 151. The top case 150 is positioned on the bare cell 110 while accommodating the protection circuit module 120 therein to protect the protection circuit module 120. The top case 150 has through-holes 150a through which the outer terminals 123 are exposed. The cover plate 151 faces the circuit board 121 and the sidewalls 152 are connected to the sidewalls 114 of the can 112.

The bottom case 160 includes a base plate 161 and side wall portions 162 extending from the edges of the base plate 161. The bottom case 160 surrounds and protects the lower portion of the bare cell 110. The base plate 161 is attached to the bottom plate 113 of the can 112 via a double-sided tape 164. The side wall portions 162 surround the lower portion of the can 112 and protect the lower portions of the sidewalls 114 of the can 112. The bottom case 160 has extension portions 163 extending upward from the side wall portions 162.

The label 170 is attached to the outer surface of the bare cell 110 so as to surround the sidewalls of the can 112. The label 170 surrounds the sidewalls 152 of the top case 150 and the extension portions 163 of the bottom case 160.

Figure 5:
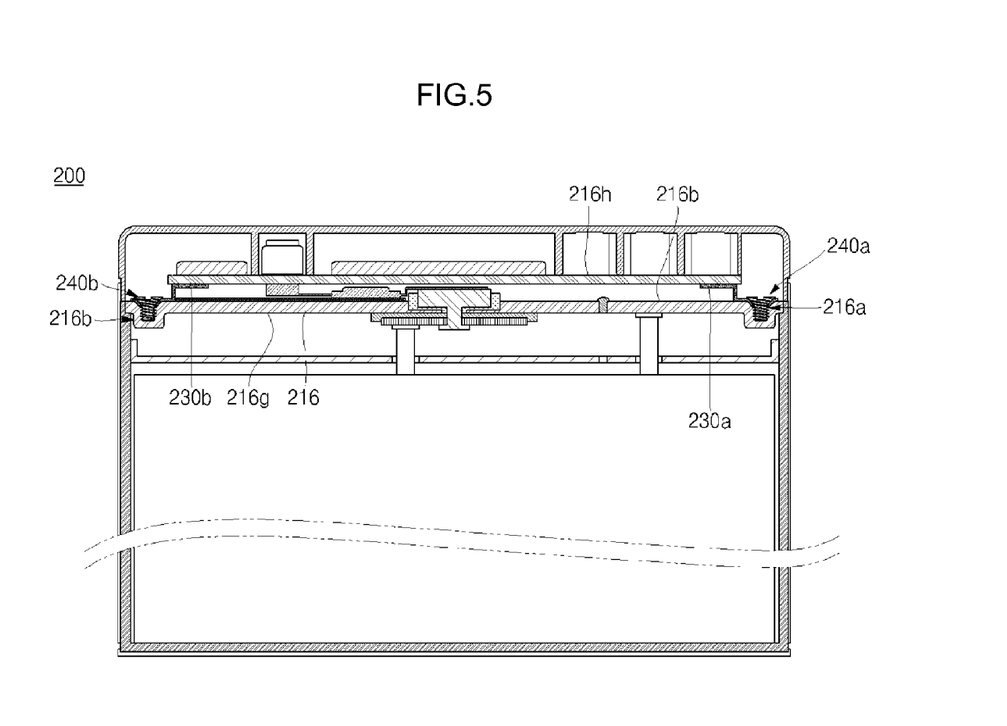
FIG. 5 is a partial cross-sectional view of a secondary battery according to a second embodiment of the present invention.
Figure 6:
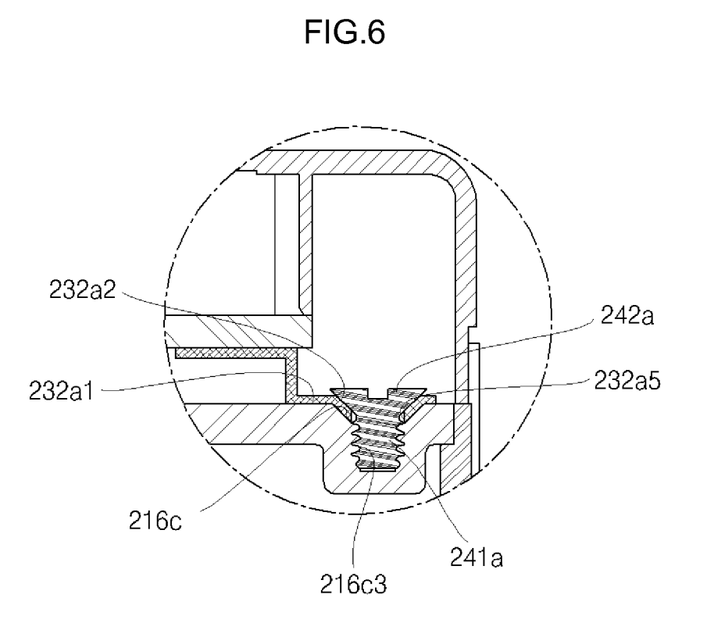
FIG. 6 is an enlarged cross-sectional view illustrating the first coupling screw and its adjacent elements in the secondary battery of FIG. 5.
Figure 7:
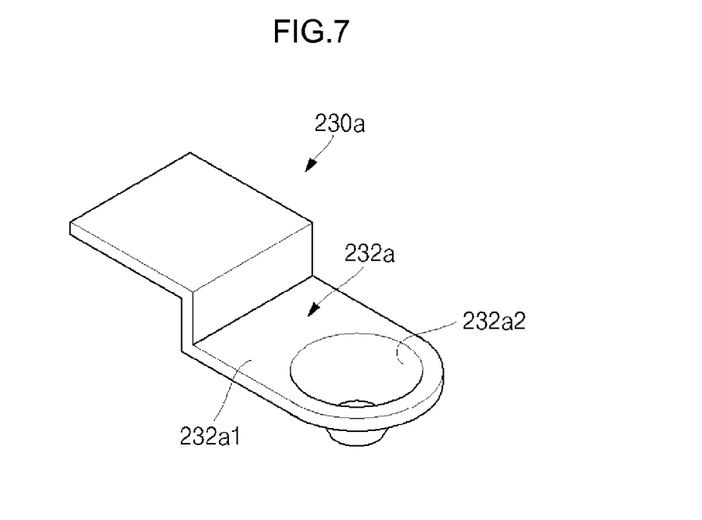
FIG. 7 is a perspective view illustrating the first connecting member of the secondary battery of FIG. 6.

A secondary battery according to a second embodiment of the present invention will be described with reference to FIGS. 5 through 7. FIG. 5 is a partial cross-sectional view of the secondary battery. FIG. 6 is an enlarged cross-sectional view illustrating the first coupling screw and its adjacent elements in the secondary battery of FIG. 5, and FIG. 7 is a perspective view illustrating the first connecting member of the secondary battery of FIG. 6. The same reference numerals are used to indicate similar elements in the first and second embodiments, and thus repeated explanations of these similar elements is omitted.

As illustrated in FIGS. 5 through 7, the secondary battery 200 includes a cap plate 216, first and second connecting members 230a and 230b, and first and second coupling screws 240a and 240b. The other elements of the secondary battery 200, except the elements 216, 230a, 230b, 240a and 240b, are similar to those of the secondary battery 100, and thus their descriptions are omitted.

The cap plate 216 has first and second coupling portions 216a and 216b. The other elements of the cap plate 216 except the elements 216a and 216b are similar those of the cap plate 116, and thus their description is omitted.

The first and second coupling portions 216a and 216b are disposed at both distal ends in the lengthwise direction of the cap plate 216. The first and second connecting members 230a and 230b are coupled to the first and second coupling portions 216a and 216b, respectively.

The first coupling portion 216a has a first contact recess 216c formed at a second surface 216h of the cap plate 216 and a first screw groove 216c3 formed within the first contact recess 216c. The first contact recess 216c has a circular shape and is inwardly tapered. The first contact recess 216c provides a space into which a portion of the first connecting member 230a can be inserted.

The first screw groove 216c3 is formed at the inner distal end of the first contact recess 216c. The first screw groove 216c3 serves as a space to which the first coupling screw 240a is coupled. The cap plate 212 has a first surface 216g that protrudes downward to make the first coupling portion 216a thicker than other portions around the first coupling portion 216a. With this configuration, the first contact recess 216c and the first screw groove 216c3 have sufficient depths.

The second coupling portion 216b is structurally and functionally identical to the first coupling portion 216a, and a detailed explanation thereof is thus omitted. The second connecting member 230b is fastened to the second coupling portion 216b via the second coupling screw 240b.

The first connecting member 230a has a bare cell connecting portion 232a. The other elements of the first connecting member 230a except the bare cell connecting portion 232a are similar to those of the first connecting member 130a, and thus descriptions thereof are omitted.

The bare cell connecting portion 232a has a base 232a1 and an insertion portion 232a2. The bare cell connecting portion 232a is fastened to the first coupling portion 216a of the cap plate 216 via the first coupling screw 240a. The bare cell connecting portion 232a is disposed in a region outside the circuit board 121 to ensure the screw coupling.

The base 232a1 is in the form of a flat plate. The base 232a1 is in contact with the second surface 216h of the cap plate 216 and supports the insertion portion 232a2. The insertion portion 232a2 is in the form of a truncated cone that protrudes downward from the base 232a1. The insertion portion 232a2 has an inner space in the form of a recess whose diameter decreases toward the distal end thereof. The insertion portion 232a2 is inserted into the first contact recess 216c of the cap plate 216. The insertion portion 232a2 has a shape corresponding to the shape of the first contact recess 216c so as to be in close contact with the first contact recess 216c. The insertion portion 232a2 has a through-hole 232a5 at the distal end thereof. The first coupling screw 240a passes through the through-hole 232a5 of the insertion portion 232a.

The insertion portion 232a2 is inserted into and positioned in the first contact recess 216c, so that the bare cell connecting portion 232a can be aligned in a correct position for screw coupling. Further, the insertion portion 232a2 and the first contact recess 216c are in contact with each other over a large area and the insertion portion 232a2 is in close contact with the first contact recess 216c via the first coupling screw 240a, leading to a reduction in electrical resistance.

The first connecting member 230b is structurally and functionally identical to the first connecting member 230a, and a detailed explanation thereof is thus omitted. The second connecting member 230b is positioned opposite to the first connecting member 230a at the other distal end in the lengthwise direction of the circuit board 121. The second connecting member 230b has a bare cell connecting portion 232b fastened to the second coupling portion 216b of the cap plate 216 via the second coupling portion 240b.

The first coupling screw 240a has a threaded body 241a and a head 242a formed at one end of the body 241a. The first coupling screw 240a fastens the first connecting member 230a to the cap plate 216. The body 241a is fixedly inserted into the first screw groove 216c3 of the cap plate 216. The head 242a has a shape corresponding to the inner space of the bare cell connecting portion 232a of the first connecting member 230a. As shown in FIG. 6, the head 242a has a truncated conical shape whose outer diameter decreases toward the body 241a. The head 242a is disposed in the inner space of the insertion portion 232a2. The head 242a is a portion that pressurizes the insertion portion 232a2 so as to be in close contact with the first contact recess 216c.

The second coupling screw 240b is structurally and functionally identical to the first coupling screw 240a, and a detailed explanation thereof is thus omitted. The second coupling screw 240b fastens the second connecting member 230b to the cap plate 216.

Figure 8:
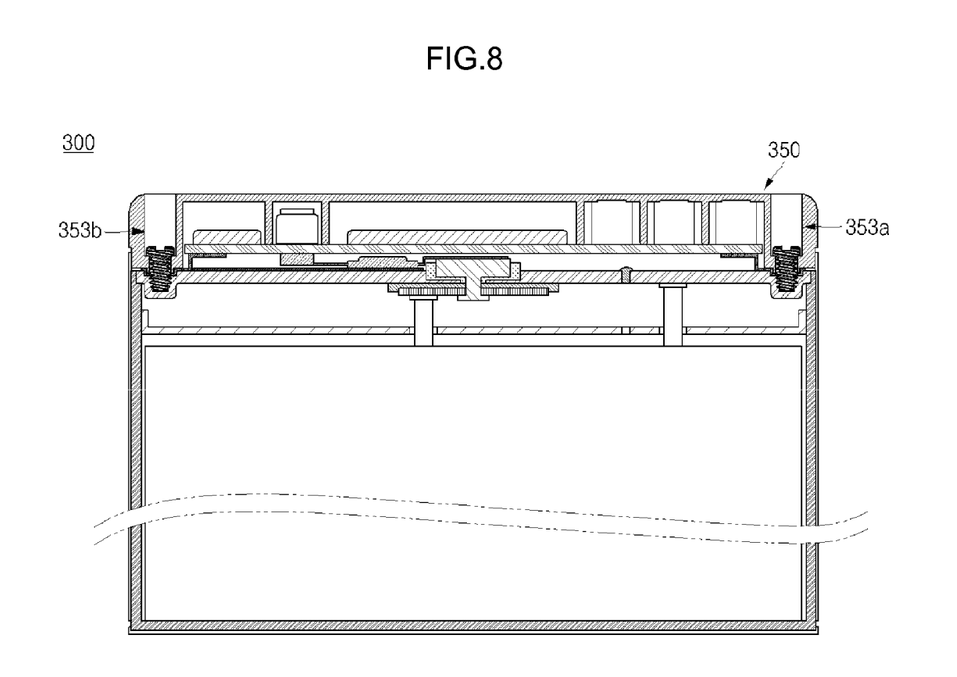
FIG. 8 is a partial cross-sectional view of a secondary battery according to a third embodiment of the present invention.
Figure 9:
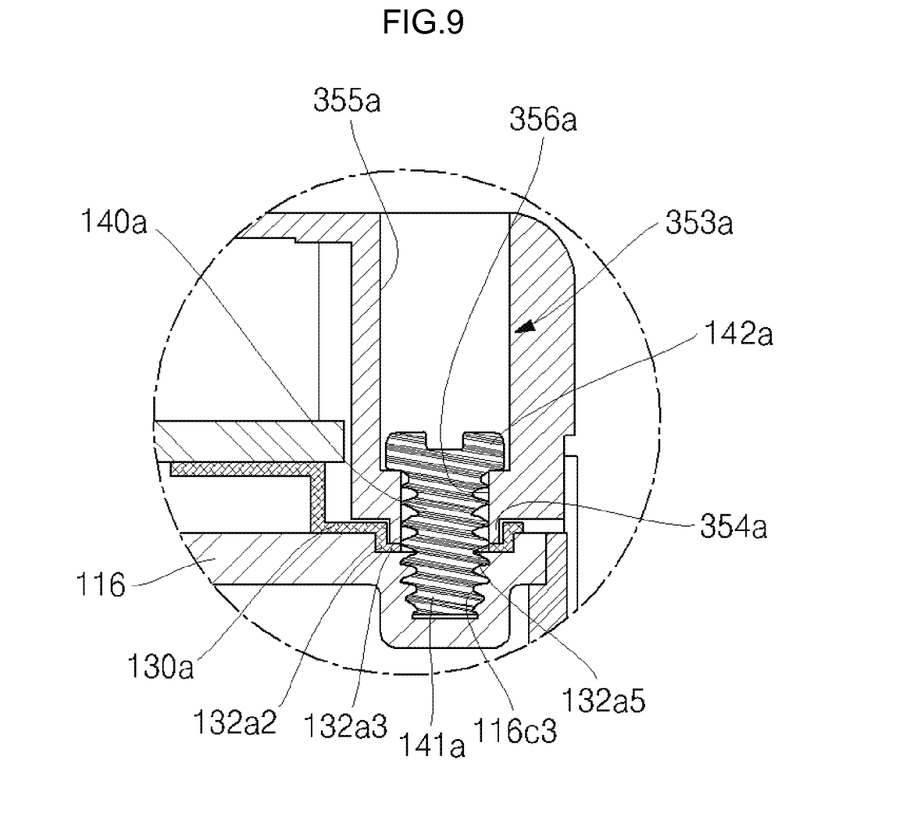
FIG. 9 is an enlarged cross-sectional view illustrating the first coupling screw and its adjacent elements in the secondary battery of FIG. 8.

A secondary battery according to a third embodiment of the present invention will be described with reference to FIGS. 8 and 9. FIG. 8 is a partial cross-sectional view of the secondary battery, and FIG. 9 is an enlarged cross-sectional view illustrating the first coupling screw and its adjacent elements in the secondary battery of FIG. 8. The same reference numerals are used to indicate similar elements in the first and third embodiments, and thus repeated explanations of these similar elements are omitted.

As illustrated in FIGS. 8 and 9, the secondary battery 300 includes a top case 350. The other elements of the secondary battery 300 except the top case 350 are similar to those of the secondary battery 100, and thus detailed explanations thereof are omitted.

The top case 350 has a first screw coupling portion 353a and a second screw coupling portion 353b. The other elements of the top case 350 except the screw coupling portions 353a and 353b are similar to those of the top case 150, and thus detailed explanations of the same elements are omitted.

The first screw coupling portion 353a has a pressing protrusion 354a. The pressing protrusion 354a is accommodated in the insertion portion 132a2 of the first connecting member 130a. The pressing protrusion 354a pressurizes the bottom plate 132a3 of the insertion portion 132a2. The first screw coupling portion 353a has an open screw guide channel 355a and a screw hole 356a formed at the bottom of the screw guide channel 355a. The first coupling screw 140a is guided through the screw guide channel 355a. The head 142a of the first coupling screw 140a is seated on the screw guide channel 355a. The screw hole 356a is in communication with the through-hole 135a5 of the first connecting member 130a and the screw groove 116c3 of the cap plate 116. The body 141a of the first coupling screw 140a passes through the screw hole 356a. The second screw coupling portion 353b is structurally and functionally identical to the first screw coupling portion 353a, and a detailed explanation thereof is thus omitted.

The top case 350 can be fastened to the bare cell 110 via the first and second screw coupling portions 353a and 353b. This screw coupling enhances the coupling between the top case 350 and the bare cell 110 and facilitates the assembly of the secondary battery 300.

Figure 10:
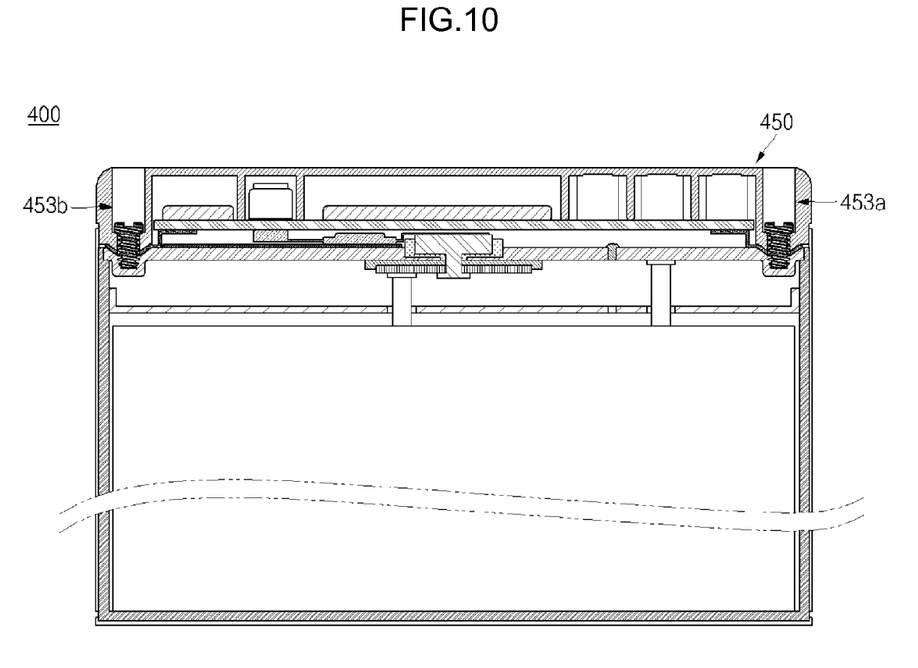
FIG. 10 is a partial cross-sectional view of a secondary battery according to a fourth embodiment of the present invention.
Figure 11:
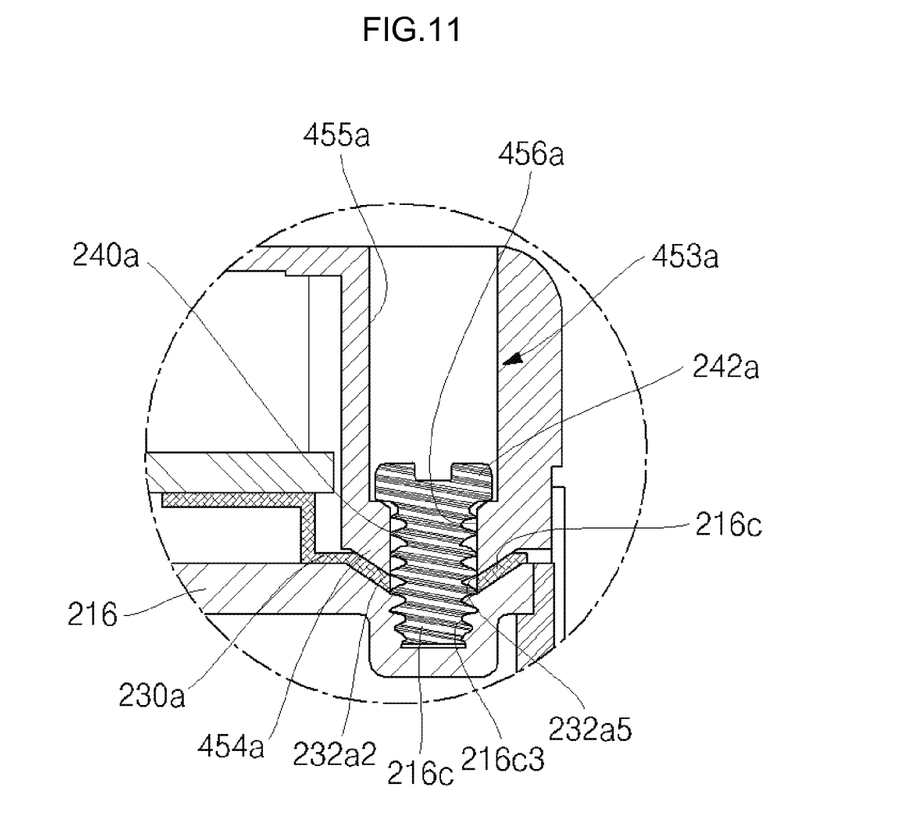
FIG. 11 is an enlarged cross-sectional view illustrating the first coupling screw and its adjacent elements in the secondary battery of FIG. 10.

A secondary battery according to a fourth embodiment of the present invention will be described with reference to FIGS. 10 and 11. FIG. 10 is a partial cross-sectional view of the secondary battery, and FIG. 11 is an enlarged cross-sectional view illustrating the first coupling screw and its adjacent elements in the secondary battery of FIG. 10. The same reference numerals are used to indicate similar elements in the second and fourth embodiments, and thus repeated explanations of these similar elements are omitted.

As illustrated in FIGS. 10 and 11, the secondary battery 400 includes a top case 450. The other elements of the secondary battery 400 except the top case 450 are similar to those of the secondary battery 200, and thus detailed explanations thereof are omitted.

The top case 450 has a first screw coupling portion 453a and a second screw coupling portion 453b. The other elements of the top case 450 except the screw coupling portions 453a and 453b are similar those of the top case 150, and thus detailed explanations of these elements are omitted.

The first screw coupling portion 453a has a pressing protrusion 454a. The pressing protrusion 454a is accommodated in the insertion portion 232a2 of the first connecting member 230a. The pressing protrusion 454a has a shape corresponding to the shape of the insertion portion 232a2 and whose outer diameter decreases toward the distal end thereof. The insertion portion 232a2 of the first connecting member 230a is in close contact with the first contact recess 216c of the cap plate 216 by the pressing protrusion 454a.

The first screw coupling portion 453a has an open screw guide channel 455a and a screw hole 456a formed at the bottom of the screw guide channel 455a. The first coupling screw 240a is guided through the screw guide channel 455a. The head 242a of the first coupling screw 240a is seated on the screw guide channel 455a. The screw hole 456a is in communication with the through-hole 232a5 of the first connecting member 230a and the screw groove 216c3 of the cap plate 216. The body 241a of the first coupling screw 240a passes through the screw hole 456a. The second screw coupling portion 453b is structurally and functionally identical to the first screw coupling portion 453a, and a detailed explanation thereof is thus omitted.

The top case 450 can be fastened to the bare cell 110 via the first and second screw coupling portions 453a and 453b. This screw coupling enhances the coupling between the top case 450 and the bare cell 110 and facilitates the assembly of the secondary battery 400.

As is apparent from the above description, in secondary batteries according to aspects of the present invention, the insertion portions of the connecting members are fitted into the respective contact recesses formed at the cap plate, so that the connecting members can be easily aligned in correct positions, achieving improved workability.

In addition, the insertion portions of the connecting members are held in close contact with the respective contact recesses formed at the cap plate, leading to a reduction in resistance. Therefore, good electrical connection between the insertion portions and the contact recesses is maintained.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A secondary battery comprising
a bare cell comprising:
an electrode assembly;
a can accommodating the electrode assembly therein and having an opening; and
a cap plate closing the opening and comprising at least one coupling portion at two opposing ends thereof in its lengthwise direction, each coupling portion having a contact recess;
a protection circuit module provided with a circuit board and adapted to control the charging/discharging of the bare cell; and
a connecting member to electrically connect the bare cell to the protection circuit module, the connecting member having a bare cell connecting portion, wherein the bare cell connecting portion has an insertion portion inserted into the contact recess, wherein the bare cell connecting portion further includes a base, and wherein the insertion portion protrudes from the base.

2. The secondary battery of claim 1, wherein:
the contact recess includes a bottom surface and side wall surface extending from the bottom surface; and
the insertion portion of the connecting member includes a bottom plate in close contact with the bottom surface of the contact recess and side wall portion in close contact with the side wall surface of the contact recess.

3. The secondary battery of claim 1, wherein the insertion portion has a shape corresponding to the shape of the contact recess.

4. The secondary battery of claim 1, wherein the connecting member further includes a circuit board connecting portion connected to the circuit board of the protection circuit module and a connecting portion connecting the bare cell connecting portion to the circuit board connecting portion.

5. The secondary battery of claim 1, wherein:
each coupling portion of the bare cell includes a screw groove; and
the secondary battery further comprises coupling screws, each coupled to a corresponding screw groove to fasten the bare cell connecting portion of the connecting member to the bare cell.

6. The secondary battery of claim 1, wherein:
the bare cell includes two coupling portions; and
the cap plate is in the form of a bar that extends in one direction.

7. The secondary battery of claim 1, wherein each coupling portion is thicker than any other portion of the cap plate.

8. The secondary battery of claim 1, further comprising a top case covering the protection circuit module and having a pressing protrusion to pressurize the bare cell connecting portion of the connecting member.

9. A secondary battery comprising
a bare cell provided with at least one coupling portion, each including a contact recess;

a protection circuit module provided with a circuit board and adapted to control the charging/discharging of the bare cell; and a connecting member to electrically connect the bare cell to the protection circuit module, the connecting member including an insertion portion seated on the contact recess of the bare cell;

wherein the diameter of the contact recess decreases inwardly, wherein the connecting member further includes a base that is in contact with the bare cell, and wherein the insertion portion protrudes from the base, wherein the insertion portion is in the form of a protrusion whose shape corresponds to the shape of the contact recess and whose diameter decreases toward the distal end thereof.

10. The secondary battery of claim 9, further comprising a pressing portion to pressurize the insertion portion of the connecting member toward the contact recess.

11. The secondary battery of claim 10, wherein:
the secondary battery further comprises a coupling screw which fastens the connecting member to the bare cell; and the pressing portion is a head formed in the coupling screw.

12. The secondary battery of claim 11, wherein the insertion portion of the connecting member has a recess accommodating the head of the coupling screw therein.

13. The secondary battery of claim 11, wherein the head of the coupling screw is in the form of a truncated cone whose diameter decreases toward a body of the coupling screw.

14. The secondary battery of claim 11, wherein the insertion portion of the connecting member has a through-hole through which the coupling screw passes.

15. The secondary battery of claim 9, further comprising a top case covering the protection circuit module and including a pressing protrusion as the pressing portion.

16. The secondary battery of claim 15, wherein the insertion portion of the connecting member has a recess into which the pressing protrusion is inserted.

17. The secondary battery of claim 16, wherein the diameter of the pressing protrusion decreases toward the distal end of the pressing protrusion.

18. The secondary battery of claim 17, wherein the insertion portion of the connecting member is in the form of a truncated cone whose shape corresponds to the shape of the pressing protrusion and whose diameter decreases toward the distal end thereof.

19. The secondary battery of claim 15, further comprising a coupling screw fastening the top case to the bare cell.

20. The secondary battery of claim 19, wherein the insertion portion of the connecting member has a through-hole through which the coupling screw passes.

21. The secondary battery of claim 20, wherein the bare cell comprises:
an electrode assembly;
a can accommodating the electrode assembly therein and having an opening; and
a cap plate closing the opening of the can;
wherein the coupling portion is in the cap plate.

22. The secondary battery of claim 1, wherein the bare cell connecting portion is disposed away from the circuit board of the protection circuit module.

* * * * *